United States Patent Office

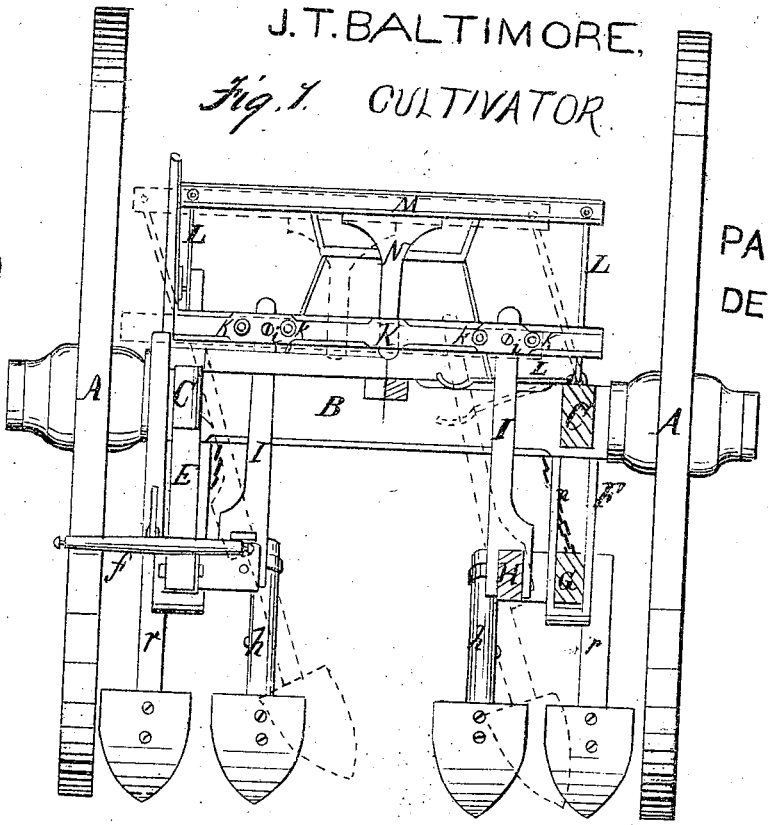
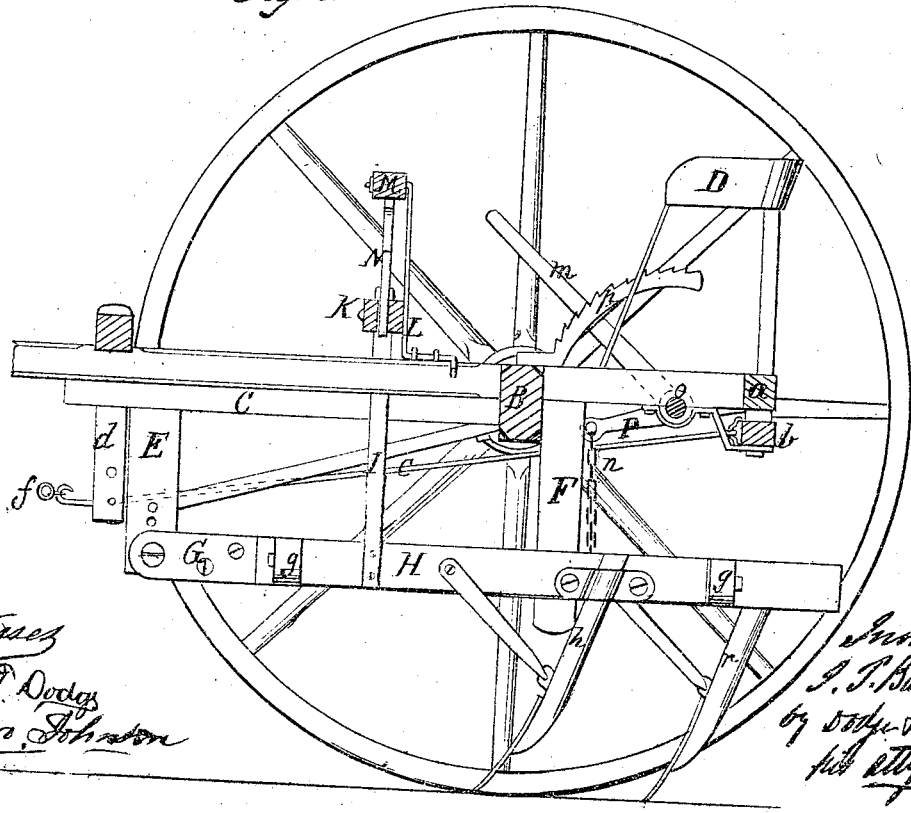

J. T. BALTIMORE, OF MARBLE ROCK, IOWA.

Letters Patent No. 72,780, dated December 31, 1867.

---

IMPROVEMENT IN CULTIVATORS.

---

The Schedule referred to in these Letters Patent and making part of the same.

---

TO ALL WHOM IT MAY CONCERN:

Be it known that I, J. T. BALTIMORE, of Marble Rock, in the county of Floyd, and State of Iowa, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cultivators, and consists of a new and improved method of moving some of the shovels laterally, at will, by the operator, so as to work them conveniently between the plants, as desired. In the drawings—

Figure 1 is a front view, with part in section, on the line $x\ x$ of fig. 2, and Figure 2 is a longitudinal vertical section on the line $y\ y$ of fig. 1.

I construct my cultivator in the form generally adopted when horses are used for drawing them, by placing two wheels, A, on the axle-tree B, and attaching thereto rigidly the frame C, as shown in figs. 1 and 2. On the rear end of the frame C, I mount the seat D, for the driver, as shown in fig. 2, and under the cross-bar $a$ of the frame C, I attach the double-tree $b$; and to each end of the double-tree $b$, I attach, by means of a hook or other convenient device, the iron rods $c$. These rods $c$ run to the opposite or front ends of the frame C, and through the lower ends of the pendent arms $d$, to which they are pivoted by any suitable means, as shown in fig. 2. The upper ends of the pendent arms $d$, I pivot to the front ends of the frame C, so as to allow them to swing or move easily. The iron rods $c$, I make long enough for the convenient attachment of single-trees $f$, as shown in figs. 1 and 2. Near the front ends of each side of the frame C, and to their under side, I frame the arms E, and to the same sides of the frame C, just behind the axle-tree B, I frame or connect rigidly, in any suitable manner, the slotted arms F, as shown in fig. 1. To the lower ends of the arms E, I hinge the beams G, as shown in fig. 2. The beams G, I make long enough to extend to the rear end of the cultivator, through the slotted arms F, as shown in fig. 1. To the inner and opposite sides of the beams G, and at right angles to those sides, I attach rigidly the arms $g$, and between these arms $g$, I place the bars H, having their bearings in the arms $g$, so as to turn easily in these bearings, as shown in fig. 2. To the bars H, I attach the shovels $h$, as shown in fig. 2, so that they will move laterally when the bars H turn in their bearings, as shown by the red lines in fig. 1. To the same movable bars H, I connect the uprights I, the upper ends of which I pass through slots in the cross-bar K, and connect them by the bolts $i$, so as to form a joint. These slots I make long enough to change the point of connection to the points $k$, when it is desired to adjust the shovels $h$ so as to cultivate closer to the plants. On the upper sides of the side pieces of the frame C, and with their bearings upon them, I place the elbowed levers L, bent as shown in figs. 1 and 2. The upper ends of the elbow-levers L are connected to the cross-bar M, so as to have a joint at their point of connection, and so as to allow the cross-bar M to stand above the cross-bar K. The height or distance of the cross-bar M above the cross-bar K, is determined by the length of the upright part of the levers L. To the middle of the under side of the cross-bar M, I connect the arm N rigidly, the lower end of which enters loosely into a mortise in the cross-bar K, for the purpose of moving it laterally, as shown in fig. 1. On the under side of the frame C, and near its rear end, I place transversely with the frame the small shaft O, having two arms, P, and lever $m$ attached. The arms P are immediately over the beams G, and are connected with them by the chains $n$. The lever $m$ is held in any desired position by means of a pin or other convenient device for catching into the curved ratchet $p$, which is rigidly attached to the side of the frame C, as shown in fig. 2.

My cultivator is operated by the driver, mounted in the seat D. In the drawings, two shovels are shown as attached to the beams G, and two to the bars H. The driver places his feet on the levers L, one on each, and moves the lever $m$ with his hand. Whenever he desires to move the shovels $h$ laterally, he has only to press down one of the levers, when the shovels take the position shown by the red lines in fig. 1. By pressing down upon the other lever, L, they may be brought into a perpendicular position, or be carried laterally over in the opposite direction. By means of the two cross-bars M and K, and their connections, as described, I am able to give the shovels a greater or wider lateral movement than they would have by the use of only one cross-bar. With my cultivator used in this way I am able to cultivate the ground thoroughly. By the use of the lever $m$, I can raise the shovels completely from the ground, and hold them up, while the cultivator is not wanted for use or is being moved, and then the shovels will not interfere with the soil.

Having thus described my invention, what I claim, is—

1. The combination of the beams G, pivoted at their front ends to the arms E of the frame C, and passing through the slotted arms F, with the beams H, pivoted to their inner sides, substantially as described.

2. The combination of the elbow-levers L, cross-bars M and K, with the standards I, connected to the beams, and arranged for operating the shovels, substantially as described.

J. T. BALTIMORE.

Witnesses:
WARREN BOON,
B. F. WRIGHT.